United States Patent
Romero

(10) Patent No.: US 9,414,569 B2
(45) Date of Patent: Aug. 16, 2016

(54) SUPPLEMENTING SYSTEM

(71) Applicant: Jeremy Steven Romero, Carthage, TX (US)

(72) Inventor: Jeremy Steven Romero, Carthage, TX (US)

(*) Notice: Subject to any disclaimer, the term of this patent is extended or adjusted under 35 U.S.C. 154(b) by 76 days.

(21) Appl. No.: 14/277,080

(22) Filed: May 14, 2014

(65) Prior Publication Data

US 2015/0327510 A1    Nov. 19, 2015

(51) Int. Cl.
*A01K 1/10*    (2006.01)
*A01K 5/02*    (2006.01)
*A01K 7/02*    (2006.01)

(52) U.S. Cl.
CPC ............... *A01K 5/02* (2013.01); *A01K 5/0225* (2013.01); *A01K 5/0291* (2013.01); *A01K 7/02* (2013.01)

(58) Field of Classification Search
CPC ..... A01K 5/0291; A01K 5/02; A01K 5/0225; A01K 5/029; A01K 7/02
USPC .......... 119/52.1, 52.4, 53, 53.4, 57.91, 51.04, 119/51.01, 51.5, 54, 24, 247, 246, 245, 230, 119/242; 222/1, 77, 413
See application file for complete search history.

(56) References Cited

U.S. PATENT DOCUMENTS

| | | | | | |
|---|---|---|---|---|---|
| 1,543,853 | A | * | 6/1925 | Hunziker | A01J 11/04 261/118 |
| 2,578,863 | A | * | 12/1951 | Trelease | A01K 39/06 119/51.01 |
| 2,858,799 | A | * | 11/1958 | Krauss | A01K 61/025 119/51.04 |
| 3,331,357 | A | * | 7/1967 | Aime | A01K 9/00 119/51.11 |
| 3,437,075 | A | * | 4/1969 | Hawes, Jr. | A01K 5/0216 119/51.5 |
| 3,498,311 | A | * | 3/1970 | Hawes, Jr. | A01K 7/02 119/51.11 |
| 3,848,567 | A | * | 11/1974 | Garber, Jr. | A01K 63/003 119/260 |
| 3,870,076 | A | * | 3/1975 | Graznak | A01K 7/02 137/3 |
| 3,975,546 | A | * | 8/1976 | Stahmann | A23J 1/007 426/49 |
| 4,027,627 | A | * | 6/1977 | Fillion | A01K 61/02 119/51.11 |
| 4,256,054 | A | * | 3/1981 | Hitchcock | A01K 5/0291 119/51.11 |
| 4,512,724 | A | * | 4/1985 | Horvath | A01K 63/047 210/167.21 |

(Continued)

FOREIGN PATENT DOCUMENTS

WO    WO 2005120634 A2 * 12/2005 ............... A01K 5/02

*Primary Examiner* — Kristen C Hayes
*Assistant Examiner* — Ebony Evans
(74) *Attorney, Agent, or Firm* — Braxton, Hilton & Perrone, PLLC

(57) ABSTRACT

A system and method for providing a supplement. The system includes a pump having an inlet and an outlet line. The inlet line is coupled to a container, and the container has a supplement. The outlet of the pump is coupled to a nozzle. The system can be housed in a support box which is coupled to a feeder which has feed. Feed is discharged from the feeder, and the pump sprays a supplement to partially coat the discharged feed. Nutrients, vitamins, etc. can be added to the supplement which can add to the value of the feed.

7 Claims, 5 Drawing Sheets

(56) References Cited

U.S. PATENT DOCUMENTS

| | | | | |
|---|---|---|---|---|
| 4,526,300 A * | 7/1985 | Woody | ............... | A21C 15/002 222/146.5 |
| 4,910,024 A * | 3/1990 | Pratt | ............... | A01K 5/0216 424/93.45 |
| 5,443,211 A * | 8/1995 | Young | ............... | E04F 21/12 239/146 |
| 5,447,565 A * | 9/1995 | Song | ............... | A23G 3/2076 118/17 |
| 6,070,808 A * | 6/2000 | Kildow | ............... | A01M 7/0035 239/146 |
| 8,074,509 B2 * | 12/2011 | Bingham | ............... | E21B 21/01 73/152.18 |
| 2005/0263541 A1 * | 12/2005 | Hoff | ............... | A01K 5/0283 222/1 |
| 2014/0267705 A1 * | 9/2014 | Hankins | ............... | A01K 5/02 348/143 |
| 2015/0181801 A1 * | 7/2015 | Niemela | ............... | A01C 17/001 119/51.01 |
| 2015/0272079 A1 * | 10/2015 | Evans | ............... | A01K 5/0225 119/51.01 |

* cited by examiner

SUPPLEMENTING SYSTEM

BACKGROUND OF THE INVENTION

1. Technical Field

The present invention relates to a system and method for supplementing feed with a supplement.

2. Description of Related Art

Feeders are used to feed game. However, feeders alone cannot provide all the nutrients and vitamins which are necessary to the game. Consequently, there is a need for a system and method which can deliver these supplements.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
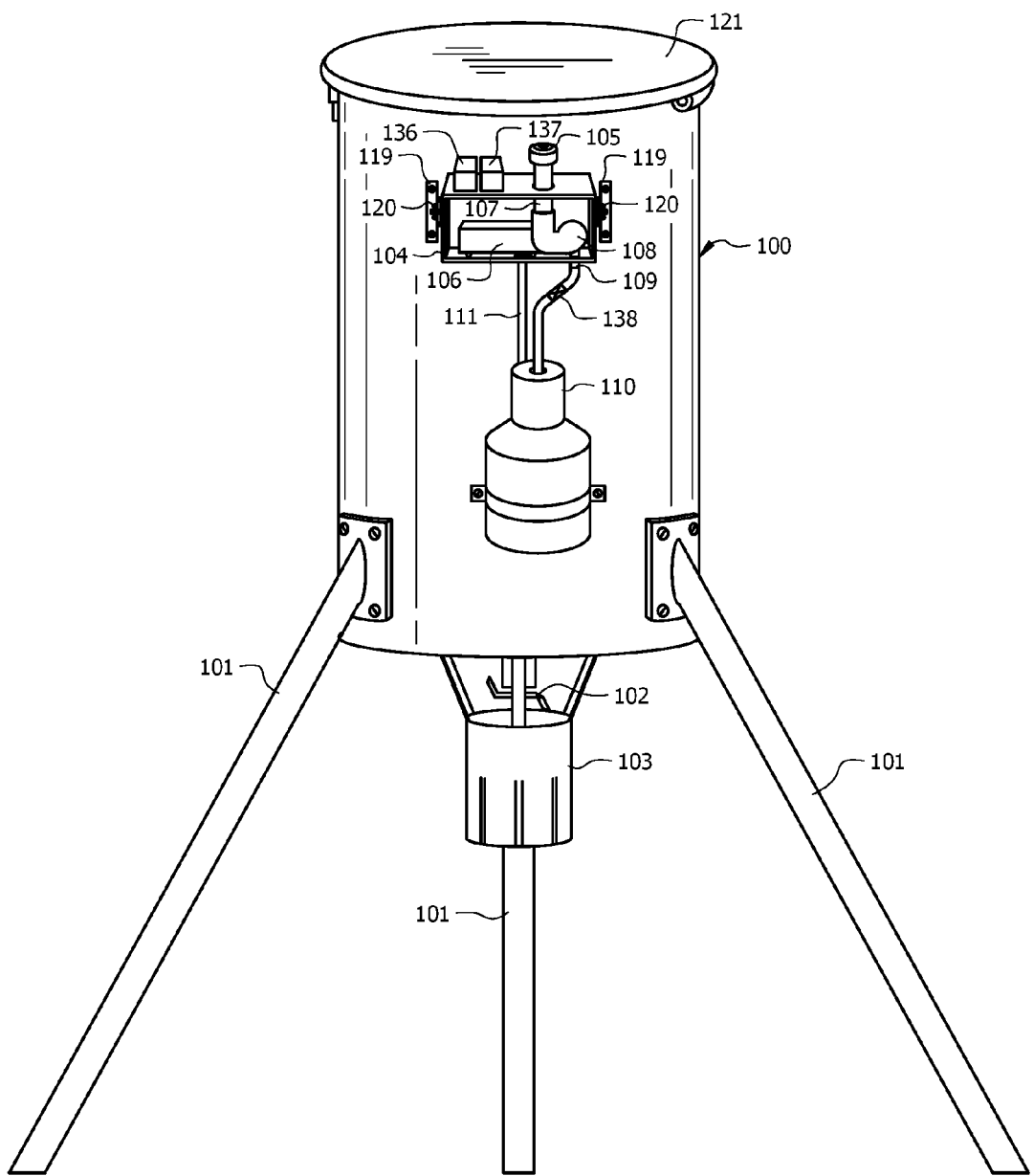
FIG. 1 is a perspective view of a feeder with a supplementing system in one embodiment.

FIG. 1 is a perspective view of a feeder with a supplementing system in one embodiment. As depicted the feeder 135 comprises a body 100 which is supported by supports 101. The feeder 100 can comprise any feeder known in the art. Such feeders can be used to supply feed for deer, such as whitetail and mule deer, elk, and virtually any wild or domesticated game. Hunters use feeders 100 to feed game. This both strengthens the game, and attempts to keep the game in the desired area.

In some embodiments game is contained within a high fence. A high fence keeps the game within an area from which they cannot escape. The game feeds, breeds, and lives within the area surrounded by the high fence. Thus, in one embodiment the feeder 100 is used within a high fenced area. In other instances the feeder 100 is used in an area which is not surrounded by a high fence.

In one embodiment the feeder 135 comprises a body 100, a timer 137, a power source 136, a spreader 102, and spreader motor 103, and feed located within the body 100. The timer can be set for virtually any time. In one embodiment the timer is set for once a day, while in other embodiments the timer is set to twelve hour increments. Often, timers are set to about 30-45 minutes after sunrise and about 1-2 hours before sunset. Once activated, the timer actuates a valve so that feed is dropped from the body 100 onto a spreader 102. The spreader 102 is manipulated by the spreader motor 103 which causes the spreader 102 to rotate. The spreader 102 causes the feed to be spread out away from the feeder 135. Most feeders average between about 0.5 and about 5 pounds of feed delivered per cycle and cover a radius of about 8 to about 15 feet. This provides the game with a larger feeding area than if the feed were simply dropped from the feeder 135. Often, game adapts to equate the sound of the timer, spreader 102, and/or the spreader motor 103 to dinner time.

The feed located in the body 100 can comprise virtually any feed known in the art. In one embodiment the feed comprise a fatty food source such as corn. In other embodiments the feed can comprise protein pellets, oat, wheat, cotton seed, virtually anything coated with molasses or other sugars, etc. In one embodiment the feed comprises extruded corn nuggets. In one embodiment the feed comprises Deer Nuggets™, Mineral, Deer Block, Sportsman, or other such feed manufactured by Record Rack® of Minneapolis Minnesota. The feeder 135 provides the hunter, landowner, or combinations thereof, to provide game with a food source in an attempt to produce healthier game. However, often the feed alone is insufficient to produce healthy game. Other nutrients such as protein, vitamins, and minerals are often lacking in a feeder which utilizes a single food source, such as corn. Such nutrients, if provided to the game, can result in larger, healthier game, with increased rack, which is desirable for many hunters. Feed which has been supplemented is often too expensive to be used by the average hunter. Often, feed which has been supplemented costs more than twice than feed which has not been supplemented. Feed which has been supplemented typically comprises a feed base which is coated with a layer of supplement before packaging. This is contrasted to the method discussed herein which discloses a feed which is supplemented, or further supplemented, after being discharged from the feeder.

Returning back to FIG. 1, FIG. 1 depicts a supplementing box 104. As used herein, a supplementing box is a container which provides equipment enabling a supplement to be dispersed onto or adjacent to dispensed feed. The supplementing box 104, while depicted as rectangular, can comprise any shape. The supplementing box 104, in one embodiment, protects its contents from the weather, moisture, etc. The supplementing box 104 can comprise virtually any material and virtually size. The supplementing box 104 can comprise metal, wood, plastic, rubber, polymer, PVC, fiberglass, and virtually any material which can be mounted and contain contents.

The size of the supplementing box 104 can vary depending on the desired application. In one embodiment the supplementing box 104 has a width of between about 6 inches and one foot, is between about 4 inches and one foot tall, and between about 6 inches and one foot in depth. In one specific embodiment the supplementing box 104 comprises a width of 8.5 inches, a height of 5.5 inches, and a depth of 5.5 inches. These measurements are for illustrative purposes only and should not be deemed limiting.

In one embodiment, the supplementing box 104 has at least one operable face. In one embodiment, the front face which is exposed to the user, is operable. An operable face is a side, panel, or portion of a panel, which can be opened, removed, or otherwise accessed. An operable face allows the user to access the supplementing box 104 to adjust, alter, or retrieve its contents. In one embodiment, the operable face is lockable allowing the owner to secure the supplementing box's 104 contents.

Figure 3:
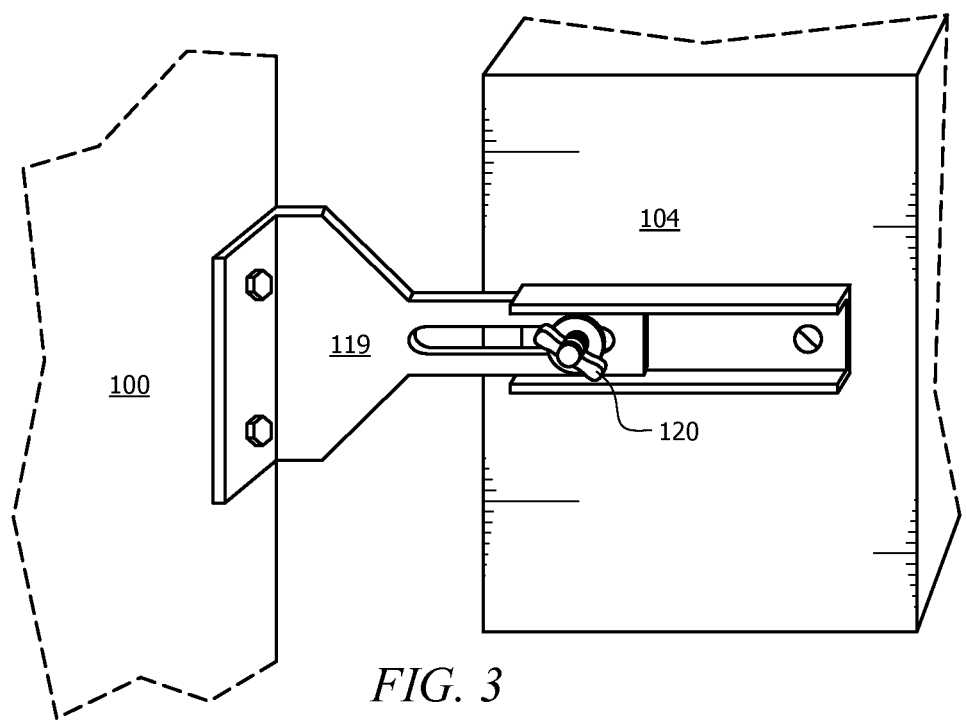
FIG. 3 is a side profile view of the supplementing box mounted to the feeder in one embodiment.

As depicted, the supplementing box 104 is coupled to the feeder 135. As used herein, coupled refers to an item which is attached, either directly or indirectly, and either permanently or temporarily, to another item. The supplementing box 104 can be coupled to the body 100 as depicted, or it can be coupled to the feeder 135 via the supports 101, or other item. The supplementing box 104 can be coupled using any device known in the art including, but not limited to, nuts, bolts, screws, mounts, brackets, etc. As depicted in FIG. 1, the mounting box 104 is coupled to the body 100 via brackets 119 and wing nuts 120, although this is for illustrative purposes only and should not be deemed limiting. A side profile view of the supplementing box 104 mounted to the body 100 can be seen in FIG. 3. As seen, the bracket 119 is secured to the body 100 by via nuts and bolts. The bracket 119 as depicted comprises a horizontal slot which receives a bolt coupled to the mounting box 104. The bolt on the mounting box 104 is coupled and secured to the bracket 119 via a wing nut 120, though other securing devices can also be utilized. The wing nut 120 allows easy removal and installation of the supplementing box 104. As depicted, the supplementing box 104 is coupled with only two brackets 119, though in other embodiments a single bracket 119, or more than two brackets 119 can be utilized. In other embodiments, however, the supplementing box 104 can be built into, or integrally made with, the feeder. In such embodiments brackets are not be necessary.

In one embodiment, the supplementing box 104 is accompanied by an installation blank. The blank can be placed upon the feeder 135 and illustrates where holes should be drilled which will allow the installation of the supplementing box 104. Thus, in one embodiment, the supplementing box 104 is installed to an existing feeder 135. This is an advantage in that it allows for use of existing feeders 135 which can be modified to comprise supplementing capabilities. In one embodiment, the user utilizes the installation blank to drill holes to allow the supplementing box 104 to be installed.

Returning back to FIG. 1, a container mount 111 couples the container 110 to the supplementing box 104. The container mount 111 can comprise any device, such as a bolt, rod, bracket, etc., which couples a container 110 to the supplementing box 104. In one embodiment an S-hook is utilized.

The container 110 contains a supplement. As used herein, a supplement refers to any nutrient which supplements feed. In one embodiment the supplement is stored in a container 110 which keeps the supplement separated from the feed in the feeder. The supplement can include, but is not limited to, protein, nutrients, vitamins, and minerals. As an example, Whitetail deer require many minerals, such as calcium and phosphorous to grow antlers. Because game with larger antlers are often preferred by hunters, increasing the antler growth is beneficial. As such, in one embodiment the supplement contains nutrients, such as calcium and phosphorous, which result in increased antler growth. Other nutrients can include, but are not limited to, vitamins, amino acids, biotin, yeast, sodium, magnesium, zinc, copper, selenium, salt, and combinations thereof. The supplement can contain products such as Shock Effect Mineral made by Shock Effect of Eureka Montana. This is a mineral formula to help maximize antler growth. The supplement can also contain products such as Monster Raxx Trophy Minerals of Buffalo Minn. In one embodiment the supplement can contain a product such as Bioplots Buck-It Mineral Site System made by Bioplots of Roxboro N.C. In other embodiments the supplement comprises a mixture used to keep unwanted game, such as squirrels, hogs, etc., away. Thus, the mixture can comprise a mixture that hogs, for example, dislike but which does not bother deer. These products, can be delivered in the method discussed below.

In one embodiment the container 110 contains an aqueous supplement. An aqueous supplement, as used herein, refers to a supplement which is in a liquid form. This includes, for example, a soluble supplement which has been dissolved in a solute, such as water. Thus, for example, if you mixed protein powder with water, the resulting mixture is an aqueous supplement.

While FIG. 1 depicts the container 110 as being located below the supplementing box 104, this is but one example and should not be deemed limiting. In one embodiment, for example, the container 110 is located above the supplementing box 104 and the inlet line 109 is coupled to the bottom of the container 104.

Virtually any size container 110 can be utilized. The size and quantity of the container 110 will vary depending on the desired use, acceptability of frequency of changing, and other factors. As an example, in one embodiment, a container 110 holding 2.5 gallons of supplement, if used with a 1 gallon per minute pump with 2 second bursts twice per day, will last over one month. A smaller container would need to be refilled or replaced more frequently.

Inside the supplementing box 104 is a pump 108 and a motor 106. The pump 108 can comprise virtually any pump known in the art, including but not limited to, centrifugal, rotary, in-line, direct, pressure, on demand, submersible, AC/DC pumps, etc. As used herein, a pump refers to a device which moves and transfers material. In one embodiment, the pump moves and transfers liquid material. In one embodiment, the pump moves and transfers solid material such as powder or particulates. In one embodiment, discussed below, the pump comprises an auger.

The output of the pump 108 can vary depending on the desired application. For example, in one embodiment the pump 108 has a discharge of between about 0.5 gallons per minute to about 10 gallons per minute. In one embodiment, a 1 gallon per minute pump can cover a radius of about 1 foot to about 15 feet in 2 second bursts. The area sprayed will be dependent upon several factors including, but not limited to, the power of the pump, the type of nozzle utilized, the rheological characteristics of the supplement, the height of the nozzle, the shape of the nozzle, etc. Those skilled in the art will understand how to adjust these variables to spray the desired area.

Figure 2:
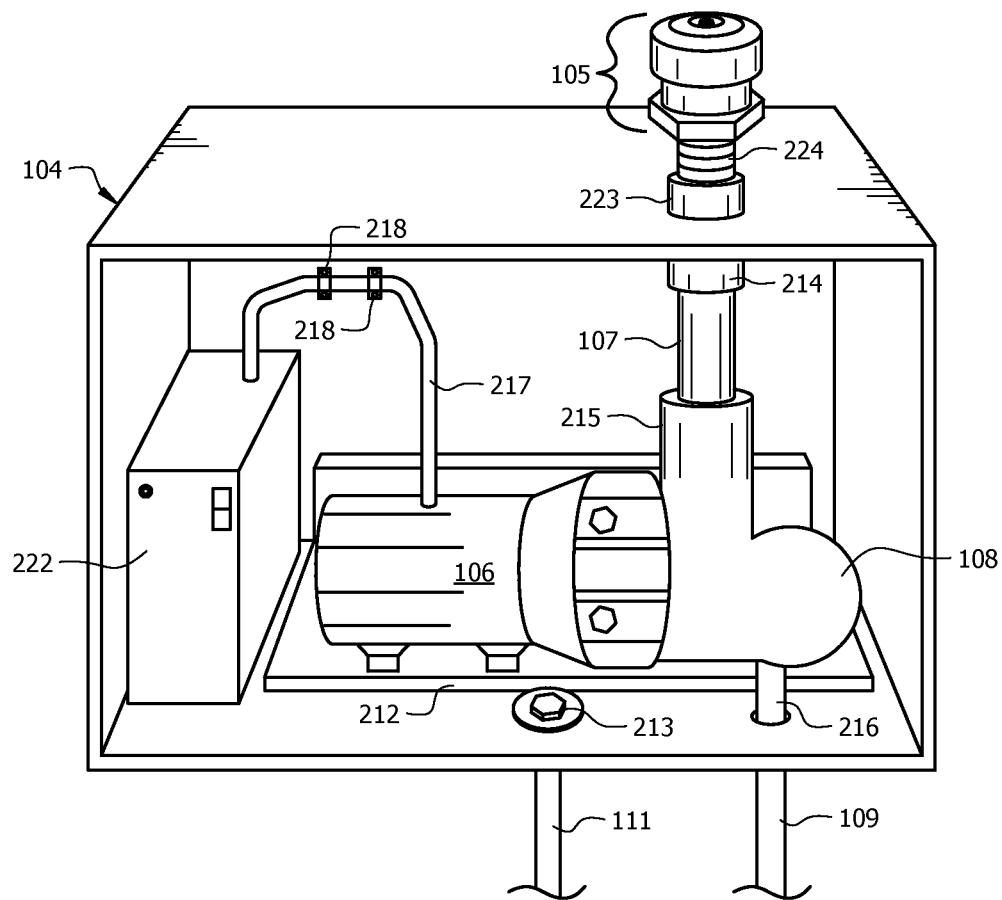
FIG. 2 is a side profile view of a supplementing box in one embodiment.

Turning to FIG. 2, FIG. 2 is a side profile view of a supplementing box in one embodiment. As depicted, the pump 108 is coupled to a motor 106. Any suitably sized motor 106 can be utilized. The motor 106 is electrically coupled to a power source 222 via a power cord 217. The power cord 217 is optionally secured to the supplementing box 104 with power cord mounts 218. The power cord mounts 218 help secure the power cord 217 in a desired and safe location which is out of the way. As depicted, the power cord mounts 218 comprise an affixing device, such as a screw, and an attaching device, such as a loop, which attaches the power cord 217 to the desired surface.

The power source 222 can be any power source known in the art including an external power line powered through an external means, such as the grid, a battery, solar panels, etc. The power source 222 can utilize AC voltage or DC voltage. In one embodiment the power source 222 is stored within the supplementing box 104. This helps keep the power source 222 free from the elements, rain, etc.

In one embodiment the power source 222 provides power to both the motor 106 and the spreader 102. This is advantageous in that a single power source 222, such as a single battery, can operate both the feeder 135 and the motor 106. This reduces the overall cost, size, and weight of the feeder and supplementing system. The power source 222 can be located in the supplementing box 104 as depicted, or it can be located elsewhere. In one embodiment wherein an existing feeder already comprises a power source, the supplementing system does not comprise a separate power source, but instead electrically couples to the pre-existing power source.

Turning back to the pump 108, the pump 108, in one embodiment, comprises an inlet opening 216 and an outlet opening 215. In one embodiment both the inlet opening 216 and the outlet opening 215 are integral with the pump 108. As depicted, the inlet line 109 couples to the inlet opening 216, and the outlet line 107 couples with the outlet opening 215. In one embodiment the inlet line 109 attaches to the pump 108 via the inlet opening 216. The openings and lines can comprise virtually any material, including rubber, plastic, PVC, stainless steel, copper, brass, other metals, and virtually any material which is formed into tubing. Likewise, the openings and lines can comprise any necessary size. In one embodiment, the lines comprise a ⅜ inch inner diameter tubing, though such a size is for illustrative purposes only and should not be limiting. The size will depend on the quantity and rate of the supplement to be added.

The inlet line 109 is coupled to the container 110. In one embodiment, and as depicted in FIG. 1, the inlet line 109 is fed through an upper opening on the container 110. In other embodiments, however, as discussed above, the inlet line 109 can be coupled to the bottom of the container 110. Regardless, the inlet line 109 is coupled to allow the supplement in the container 110 to be withdrawn and pumped by the pump 108. In one embodiment, the inlet line 109 is coupled to the suction side of the pump 108. Thus, when the pump 108 is operating, supplement is drawn from the container 110 and pumped through the pump 108 into the outlet line 107.

In one embodiment, the inlet line 109 further comprises a check-valve 138. A check-valve, or other similar device, only allows fluid flow in one direction. Thus, the check-valve allows flow of fluid from the container 110 toward the pump 108 but disallows the flow of fluid from the pump 108 toward the container 110. A check-valve 138, or other similar device, keeps fluid in the inlet line 109 such that when the pump 108 is activated, fluid is already at the pump 108 and ready to be delivered to the nozzle 105. If there was not a check-valve then, depending on the power of the pump, it may take a few seconds for fluid to reach the nozzle 105. Consequently, for embodiments wherein the pump 108 only operates for a few seconds at a time, a check-valve, or similar device, helps ensure the pump 108 is primed with fluid.

As depicted, the outlet line 107 is coupled to the discharge side of the pump 108. The outlet line 107 delivers the withdrawn supplement to be discharged from the container 110. As depicted, the outlet line 107 is coupled to the container mount 214. The container mount 214 is coupled and anchored to the supplementing box 104. On the outside of the supplementing box 204, the nozzle mount 223 couples to the container mount 214. The nozzle mount 223 is then coupled with a nozzle coupler 224 which couples with the nozzle 105. The nozzle coupler 224 can be tubing or any other coupling device. Thus, supplement is withdrawn from the container 110, through the inlet let 109, through the pump 108, through the outlet line 107, and through nozzle 105. The supplement is then discharged through nozzle 105. While an embodiment has been described with various connectors, in one embodiment the outlet line 107 couples directly to the nozzle 105. One skilled in the art will understand that various connectors can be utilized to provide the necessary adaptability, such as coupling a ¼ inch line to a ½ in line, etc. Further, connectors can be utilized to provide increased structural rigidity.

The nozzle 105 can comprise virtually any nozzle known in the art. Many nozzles 105 can control flow rate, flow pattern etc. Thus, virtually any desired flow pattern can be achieved. For example, a cone spray, semi-circle, full circle, narrow band, wide band, etc. can all be used. Both stationary and rotating nozzles 105 can also be used.

Figure 4:
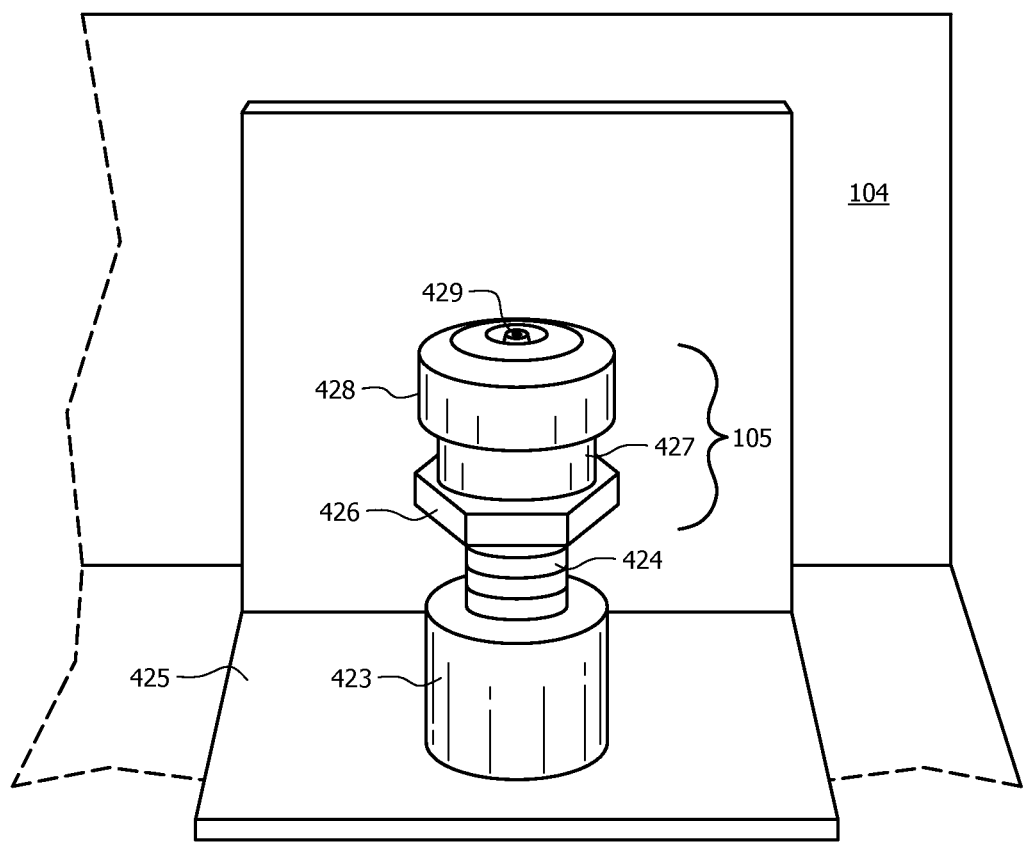
FIG. 4 is a perspective view of the nozzle in one embodiment.

The nozzle spray pattern and rate can be controlled by adjusting and selecting a desired nozzle 105. In one embodiment, for example, the nozzle 105 comprises a 360° spraying radius. In other embodiments the nozzle 105 comprises a spraying radius of less than 360°. For example, in one embodiment the nozzle 105 comprises a spraying radius of about 270° whereas in other embodiments the nozzle 105 comprises a spraying radius of about 180°. In one embodiment the nozzle 105 comprises a spray radius of between about 10° and about 360°. FIG. 4 is a perspective view of the nozzle 105 in one embodiment. Virtually any type of nozzles 105 can be used. As depicted, the nozzle 105 comprises a nozzle made by Boominator® of Lino Lakes Minn. Such nozzles allow for easy adjustment and replacement. In one embodiment the nozzle 105 comprises an adjustment device 429 which allows for the fine-tuning of the spray pattern. Other embodiments use a nozzle made by TeeJet® of Wheaton Ill. Those skilled in the art will be able to choose a suitable nozzle 105 type based on desired pattern, flow rate, rheological properties of the supplement, etc. Furthermore, while reference has been made to a single nozzle 105, this is for illustrative purposes and should not be deemed limiting. In other embodiments, two or more nozzles 105 are utilized. Thus, for example, a first nozzle sprays from a first side of the supplementing system whereas a second nozzle sprays from a second side of the supplementing system. In one embodiment a single supplementing system comprises two or more nozzles 105. Thus, a single pump 108, for example, feeds two or more nozzles 105. This allows for increased spreading ability without the need for additional equipment, such as multiple pumps 108, etc.

As discussed, the nozzle 105 is used to discharge supplement. In one embodiment, the supplement is discharged so as to coat or partially cover the feed which was spread by the feeder. The supplement can be added simultaneously with, before, or after, the feed has been discharged and spread by the feeder 135. In one embodiment, after the timer of the feeder 135 stops flow of further feed, the timer activates the operation of the supplementing system. Thus, once the timer stops the spreader 102, the timer activates the pump 108. The timer which activates the pump 108 can be the same timer used on the feeder or a separate timer. This allows feed which has been spread by the spreader 102 to be subsequently coated, or partially covered, by the supplement. In this fashion, supplement can be added to the base feed. In one example, after the spreader 102 spreads corn, the supplementing system thereafter covers the corn with additional protein. Thus, when game such as deer eat the corn, they also ingest the supplement.

While a timer has been described, this should not be limited. Other devices, such as a photo eye, sense daylight. Accordingly, they turn off and on at sunrise, sunset, etc.

Such an application method has several benefits. First, because the supplement is applied onto the feed, the supplement is typically ingested with minimal waste. As noted, game come to recognize the sound of the timer, spreader 102, and/or spreader motor 103. Game is familiar with the feeder 135 and often stop and feed. Consequently, typically the feed provided by the feeder 135 does not last long. Thus, the supplement which has partially coated at least some of the feed will be ingested quickly. It will not have long to sit and get eroded, washed away, or leached away by the elements. Such erosion and leaching results in a wasting of the supplement. Thus, the application results in more supplement being utilized and less supplement being wasted.

Second, because the supplement is applied by a machine, the game will not smell and turn away from the human scent as is the case when feed or protein is hand applied.

Third, because the supplement is distributed automatically, the game is supplemented without requiring the landowner to remember to daily spread the supplement.

The supplementing system can be placed at the hunting location, or it can be placed in a location which is not hunted. The system can be used to help with nursing does, horn growth, weight gain, digestive issues, rut recovery, fur thickness, or even a liquid feed, dependent upon the supplement utilized. Virtually any ingredient, such as nutrients, vitamins, minerals, or medicine, can be distributed by the supplementing system. Further, in one embodiment, the supplement comprises a mixture which seeks to deter unwanted animals, such as raccoons or hogs. Unwanted game eats feed and costs the landowner or hunter time and money. Deterring such unwanted game will result in significant cost and time savings.

While an embodiment wherein the feeder is used for deer has been described, this is for illustrative purposes and should not be deemed limiting. Virtually any animal, wild or domestic, can be supplemented with the supplementing system. For example, the supplementing system can be used for cows, horses, pigs, deer, elk, exotic animals, etc. Virtually any animal can benefit from the feeder.

As discussed, in one embodiment the supplement comprises a liquid. For example, the supplement can comprise a powder or gel which has been dissolved or suspended in a solvent, such as water. Thus, in one embodiment the supplement comprises particulate vitamins, minerals, powders, and/or combinations thereof, which has been suspended or dissolved in a liquid medium. Thus, the container 110 holds a liquid which is pumped and spray delivered through a nozzle 105. The product described above, such as the Shock Effect Mineral, as one example, can be mixed with water to suspend or dissolve the nutrients in a liquid medium.

While an embodiment utilizing an aqueous supplement has been described, in other embodiments a particulate or powder supplement is utilized. In such an embodiment, the container 110 comprises a particulate or powder rather than a liquid. In one embodiment, the particulate or powder is applied via an auger. An auger, as used herein, refers to any device which moves powder, particulates, or other flowable solid material. As an example, the product described above, such as the Shock Effect Mineral, can be applied as its natural form without prior mixing with water or other such liquid medium.

While an embodiment has been described with reference to the automatic feeder of FIG. 1, this is for illustrative purposes only and should not be deemed limiting. The supplementing system can be utilized on virtually any type of feeder including, but not limited to, the elevated automatic feeder of FIG. 1, trough type feeders whereby feed is placed either manually or automatically into a trough from which game retrieves the feed, and other types of feeders. Further, in one embodiment, as discussed in more detail below, the supplementing system comprises a stand-alone system which is not coupled to a feeder.

Figure 5:
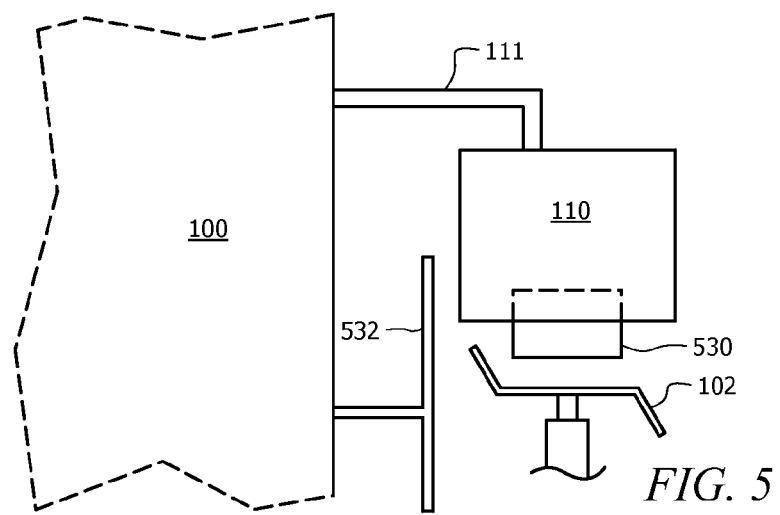
FIG. 5 is a side profile view of an auger in one embodiment.

FIG. 5 is a side profile view of an auger in one embodiment. As depicted, the container 110 is attached to the body 100 via the container mount 111. The auger 530 can be any auger utilized in the art and can comprise valves, actuators, rotary equipment, etc. As depicted, supplement is discharged from the auger 530 and subsequently falls upon a spreader 102. The spreader 102 acts to spread the supplement so that it falls atop the below feed.

The system can further comprise a spreader back splash 532 which limits the direction of discharge from the spreader 102. For example, the back splash 532 may prevent supplement from being spread in the direction of the body 100.

Figure 6:
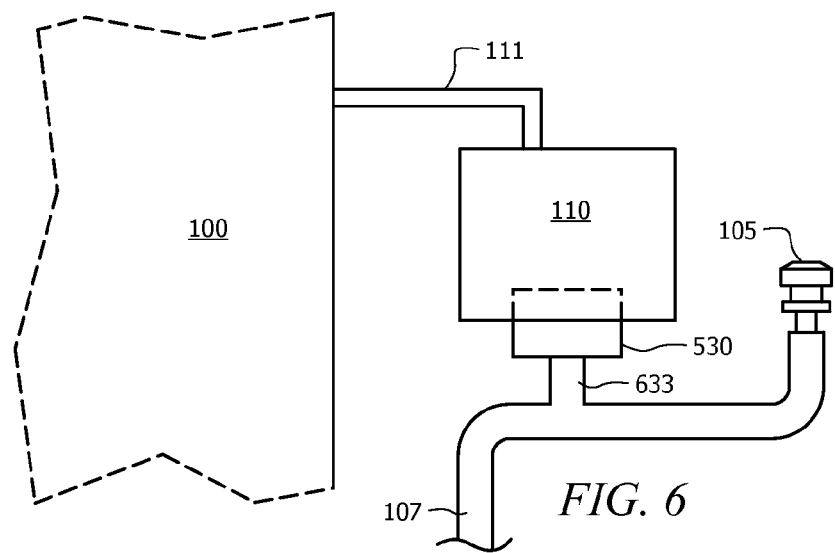
FIG. 6 is a side profile view of an auger feeder system in one embodiment.

FIG. 6 is a side profile view of an auger feeder system in one embodiment. In FIG. 6, the auger 530 is coupled to an entry line 633 which is coupled to the outlet line 107. In one embodiment, the outlet line 107, or the inlet line 109, uses a Venturi effect to pull supplement from the container 110 and out through the nozzle 105. Such a system can be used for supplements which do not mix with water or other solvents to create a homogenous mixture, but instead settle at the bottom over time. For such supplements, in one embodiment, they are mixed with a solvent, such as water, immediately before being discharged. The solvent, such as water, can be held by another container or other source and retrieved via a pump. The solvent acts as a carrier to transport the supplement through the nozzle 105 and onto the below feed.

In one embodiment wherein there is a suitable water source, such as a water line, the pressure within the waterline eliminates any need for a separate pump. Rather, when the timer activates, the auger or valve allows the flow of water to pull supplement into the stream for subsequent discharge through the nozzle.

Figure 7:
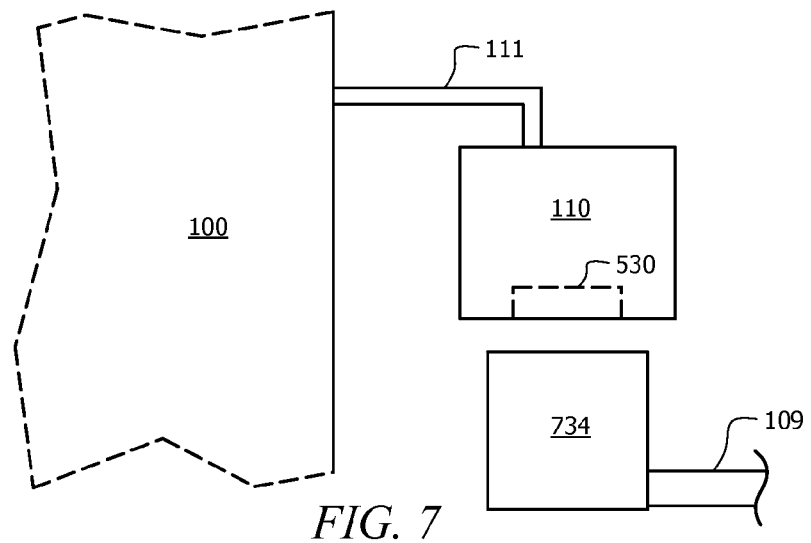
FIG. 7 is a side profile view of a mixing system in one embodiment.

FIG. 7 is a side profile view of a mixing system in one embodiment. In such an embodiment an amount of supplement is transferred from the container 110 to the mixing container 734 where it is mixed with a liquid which is then transferred via the pump 108.

Figure 8:
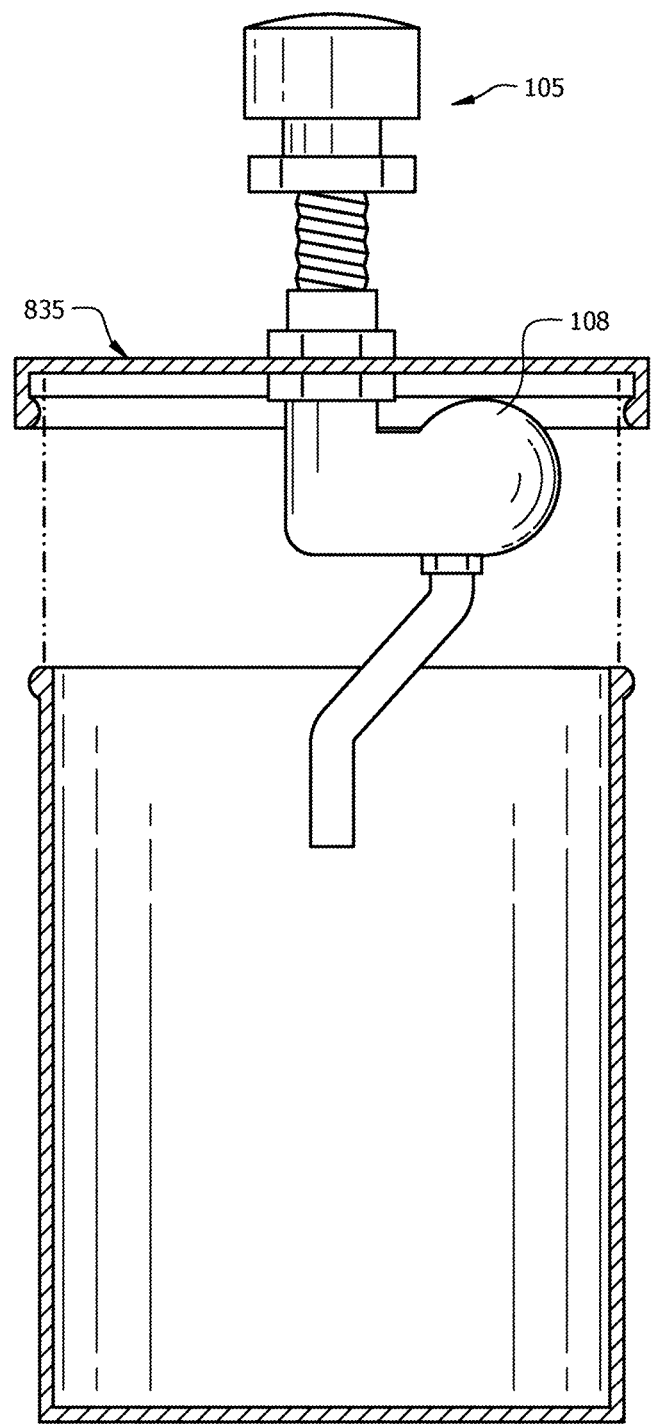
FIG. 8 is a side profile view of a stand-alone supplementing system in one embodiment.

FIG. 8 is a side profile view of a stand-alone supplementing system in one embodiment. A stand-alone supplementing system is a system which is not coupled or attached to a feeder. A stand-alone supplementing system can be used anywhere and is thus not dependent upon the location of a pre-existing feeder. The stand-alone supplementing system can be used for a mineral site whereby minerals and other nutrients, vitamins, etc., are placed on a site removed from feed from a feeder. The game can then absorb the nutrients through licking, eating, drinking, etc.

An additional benefit of the stand-alone supplementing system is that it allows the hunter or landowner to capitalize on many of the benefits of the supplementing system even if they do not own a feeder.

As depicted, the stand-alone feeder comprises the container 110 and a pump 108 housed in a housing 835. The housing 835 can also comprise the motor 106, power source 222, etc. previously described. Atop the housing 835 is the nozzle 105. To replace the container 110, the user need only lift or open the housing 835 and replace the container 110. The housing 835 can comprise any materials previously discussed above regarding the supplementing box 104. In one embodiment the housing 835 comprises a bucket, such as a 5 or 10 gallon bucket. The housing 835 can rest upon the ground, as depicted, or the housing 835 can be suspended from a tree, tripod, or other such structure.

While the pump 108 is depicted as being located on the outside of the container 110, in other embodiments the pump 108 is located inside of the container 110. For example, in one embodiment the pump 108 is a submersible pump which is submersed in the container 110.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A system for providing a supplement, said system comprising:
 a pump, wherein said pump comprises an inlet line and an outlet line;
 wherein said inlet line is coupled to a container, wherein said container comprises a supplement;
 wherein said outlet of the pump is coupled to a nozzle.

Clause 2. The system of any proceeding or preceding claim wherein said pump is housed in a support box, wherein said support box is coupled to a feeder, wherein said feeder comprises feed, and wherein said feed is dissimilar from said supplement.

Clause 3. The system of any proceeding or preceding claim wherein said feeder comprises an automatic spreader feeder, wherein said container is suspended below said support box, wherein said support box has at least one operable face, and wherein said nozzle is located above said support box.

Clause 4. The system of any proceeding or preceding claim wherein said support box further comprises a motor.

Clause 5. The system of any proceeding or preceding claim wherein said support box further comprises a power source.

Clause 6. The system of any proceeding or preceding claim further comprising a timer.

Clause 7. The system of any proceeding or preceding claim wherein said support box further comprises a container support.

Clause 8. The system of any proceeding or preceding claim wherein said support box is attached to an external surface on a feeder by at least one bracket.

Clause 9. The system of any proceeding or preceding claim wherein said pump is a submersible pump.

Clause 10. A method for providing a supplement, said method comprising:
 a) discharging feed from a feeder;
 b) initiating a pump, wherein said pump collects supplement from a container;
 c) discharging the supplement onto said feed through a nozzle, wherein said supplement at least partially coats the feed, and wherein said supplement is dissimilar from said feed.

Clause 11. The method of any proceeding or preceding claim wherein said supplement comprises an aqueous liquid.

Clause 12. The method of any proceeding or preceding claim wherein said discharging of feed of step a) takes place before said discharging of step c).

Clause 13. The method of any proceeding or preceding claim wherein said feeder is an automatic feeder comprising a spreader.

Clause 14. The method of any proceeding or preceding claim wherein said container is coupled to said feeder.

Clause 15. A system for a supplementing box which is to be coupled to a feeder, said system comprising:
 a support box coupled to at least one bracket, wherein said at least one bracket can be coupled to a feeder;
 a pump housed in said support box, wherein said pump comprises an inlet line and an outlet line, wherein said outlet line is coupled to a nozzle, and wherein said nozzle is located outside of said support box;
 a container mount coupled to the support box.

Clause 16. The system of any proceeding or preceding claim further comprising an installation blank for coupling said at least one bracket to a feeder.

Clause 17. The system of any proceeding or preceding claim further comprising a motor coupled to the pump.

Clause 18. The system of any proceeding or preceding claim wherein said container mount extends from the bottom of the support box, and wherein the nozzle extends from the top of the support box.

Clause 19. The system of any proceeding or preceding claim wherein said inlet line comprises a check-valve.

Clause 20. The system of any proceeding or preceding claim further comprising a container for coupling with said container mount, wherein said container comprises a supplement.

Clause 21. The system of any proceeding or preceding claim wherein said supplement comprises an aqueous supplement.

Clause 22. The system of any proceeding or preceding claim wherein said aqueous solution comprises protein suspended in a liquid medium.

Clause 23. The system of any proceeding or preceding claim wherein said supplement comprises calcium and phosphorus.

Clause 24. The system of any proceeding or preceding claim wherein said brackets are coupled to a feeder.

Clause 25. The system of any proceeding or preceding claim wherein said brackets are coupled to said feeder via bolts.

Clause 26. The system of any proceeding or preceding claim wherein said feeder comprises an automatic spreader feeder, and wherein said brackets are coupled to a body of said feeder, wherein the body of the feeder houses feed.

What is claimed is:

1. A system for providing a supplement, said system comprising:
 a pump, wherein said pump comprises an inlet line and an outlet line;
 wherein said inlet line is coupled to a container, wherein said container comprises a supplement;
 wherein said outlet line of the pump is coupled to a nozzle;
 wherein said pump is housed in a support box, wherein said support box is coupled to a feeder, wherein said feeder comprises feed, and wherein said feed is dissimilar from said supplement, and wherein said feeder comprises an automatic spreader feeder, wherein said container is suspended below said support box, wherein said support box has at least one operable face, and wherein said nozzle is located above said support box.

2. The system of claim 1 wherein said support box further comprises a motor.

3. The system of claim 1 wherein said support box further comprises a power source.

4. The system of claim 1 further comprising a timer.

5. The system of claim 1 wherein said support box further comprises a container support.

6. The system of claim 1 wherein said support box is attached to an external surface on said feeder by at least one bracket.

7. The system of claim 1 wherein said pump is a submersible pump.

* * * * *